Nov. 21, 1944.  G. P. E. HOWARD  2,363,419
SUBMERSIBLE PUMP
Filed May 5, 1942  3 Sheets-Sheet 1
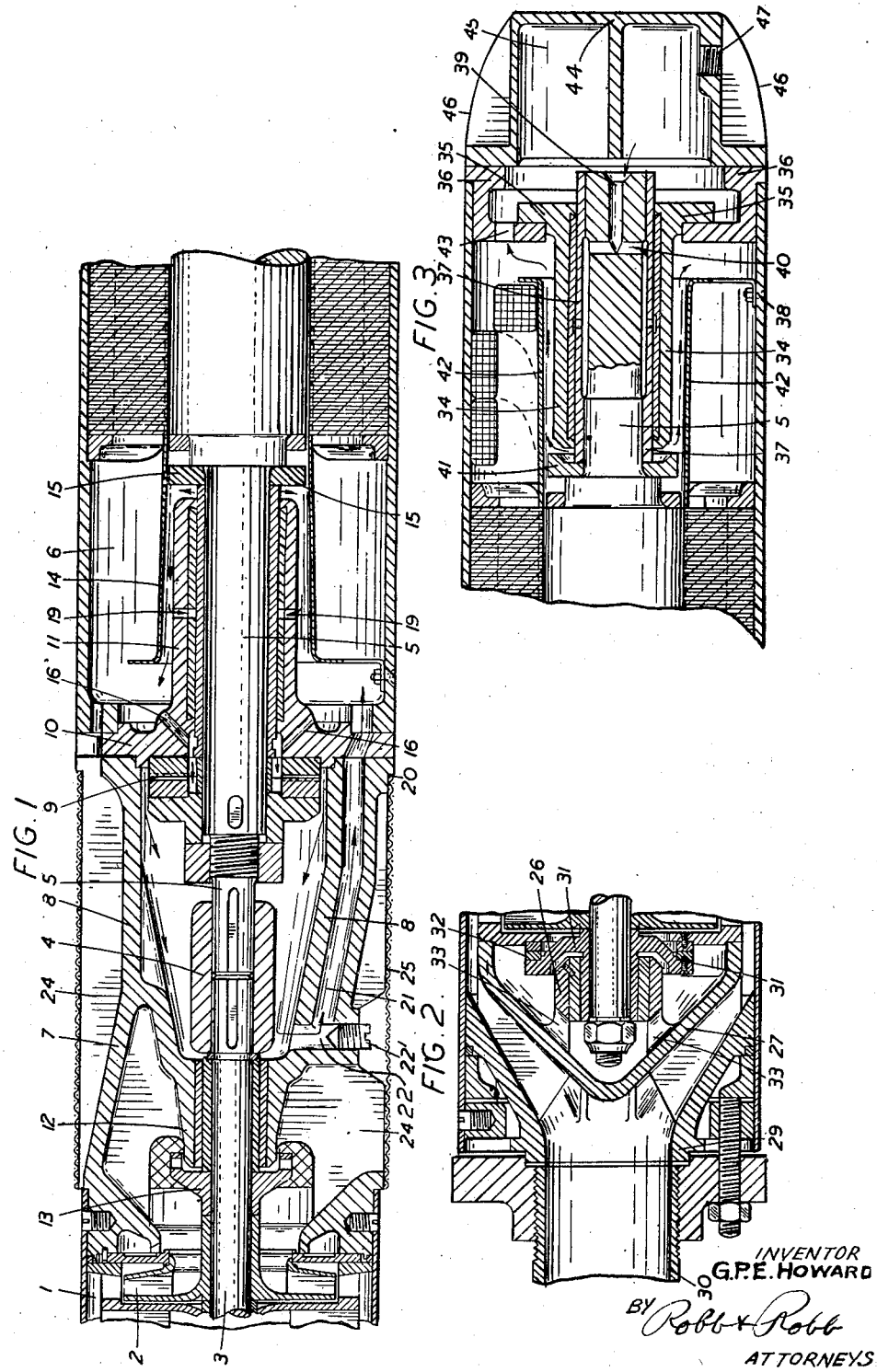

Nov. 21, 1944.  G. P. E. HOWARD  2,363,419
SUBMERSIBLE PUMP
Filed May 5, 1942  3 Sheets-Sheet 2

INVENTOR
G. P. E. HOWARD
BY
Robb & Robb
ATTORNEYS

Nov. 21, 1944.    G. P. E. HOWARD    2,363,419
SUBMERSIBLE PUMP
Filed May 5, 1942    3 Sheets-Sheet 3

INVENTOR
G.P.E. HOWARD
BY
Robb & Robb
ATTORNEYS

Patented Nov. 21, 1944

2,363,419

UNITED STATES PATENT OFFICE 2,363,419

SUBMERSIBLE PUMP

Giles Philip Eliot Howard, Amersham, England

Application May 5, 1942, Serial No. 441,843
In Great Britain May 5, 1941

9 Claims. (Cl. 103—87)

This invention relates to submersible pump units of the type in which an electromotor and a centrifugal pump are coupled together and encased in a water-tight housing to form a unit adapted to run completely submerged or surrounded by a liquid such as water.

Pump units of this kind are required to operate indefinitely without attention and consequently the question of lubrication of the bearings of the motor and pump is of vital importance.

Various expedients have been proposed and tried for the lubrication of these bearings, but all have to be attended to and the lubricant replenished at definite intervals if failure is to be avoided. This entails the certain expense of lifting the pump sometimes several hundred feet, and is objectionable. The obvious solution is to use the surrounding liquid as the lubricant and this has already been proposed, in connection with pumps, but it is essential for indefinite life that film lubrication should be provided, and not boundary lubrication or actual contact which would result in continuous slight wearing of the bearings with consequent termination of their effective life.

In the case of the bearings of a submerged pump there is no difficulty in effecting this since there is normally no large unbalanced weight or force tending to load the bearings and they are efficiently cooled by the liquid being pumped. Plain journal bearings may be used, with a suitable water groove or pressure drop to ensure a slight flow of the liquid through the bearing clearance. The materials may vary widely, but if fabric bearings of the phenolic type are used it becomes necessary to take extra precautions against shortage of liquid or coolant, and various proposals have been made to this end.

My aim has been to provide water lubrication of all the bearings of a submersible pump unit and at the same time to ensure that the bearings shall be effectually maintained at a uniform low temperature in order that optimum bearing conditions may be afforded irrespective of the nature of the materials used which may then be selected with reference to their wearing qualities only.

To this end, the invention consists primarily in enclosing a bearing of a submersible pump unit in a cavity from the walls of which heat is withdrawn by pumped liquid or liquid surrounding the pump and providing means whereby the liquid in said cavity is forcibly maintained in circulation and/or turbulence so as to ensure both an adequate flow of liquid through the bearing clearance and effective heat transfer from the bearing to the cavity walls.

The forced movement of the water in the enclosing cavity is preferably set up by providing within such cavity means such as a flange or annulus which rotates with the impeller shaft and is capable of exerting an impelling action on the water in its immediate vicinity. In this way a vigorous vortex or a more or less well defined internal circulation is maintained within the cavity under a considerable head, which may amount to several feet of water column.

According to a further feature of the invention I provide the bearing with a substantially tubular shell extending into said cavity and when, as is usually the case, ribs or webs are provided to strengthen the shell and to unite it to the cavity wall, these elements contribute to the dissipation of heat from the bearing, both by conduction and by tending to confine the turbulent or circulatory flow, induced in the manner indicated, in paths extending longitudinally of the bearing shell. Thus, for instance, such fins may be provided in conjunction with an admission piece of the kind described in British Application No. 5828/41 filed 5th May 1941 having a substantially tubular shell for the pump shaft main bearing extending forwardly of the base of the socket portion, into the intake portion of the admission piece in which the required turbulence is set up by the conventional sand bell enclosing the upper end of the bearing and also by the flow of water into the eye of the first impeller. Similarly, axial fins may also be provided to connect the shell of the top end bearing of the pump to a cap member which encloses an eddying space in which turbulence is set up by a flange formed on a bearing sleeve fast on the pump shaft for the purpose of carrying a relieving or balancing wearing ring. In this case, apertures may be provided where the root of the bearing sleeve joins the cap member communicating with a cavity at the extreme end of this member, through which swirling water can gain access to the end face of the bearing.

The invention further comprises water lubrication of the motor bearings on the same principles. In the case of these bearings, however, the difficulty arises that the cavities of the motor are remote from the pump and from the influence of the flow therethrough. The invention therefore comprises the provision of a water-filled cooling chamber enclosing or adjacent to each of the motor bearings, means for allowing the enclosed water to circulate past and/or through the bearing, and means associated with the motor shaft for inducing such circulation.

The circulation inducing means again preferably consists of an annular flange on the bearing sleeve or on a member fast on the motor shaft, which flange, at the high speed of rotation of the motor, will exert a substantial centrifugal action on the surrounding water.

With a pump unit constructed in accordance with the said British application No. 5828/41, the circulation chamber enclosing the top motor and bearing may communicate with the cooling chamber formed by the socket portion of the admission piece containing the power coupling, on the one hand through one or more apertures at the root of the bearing shell attached to the motor end plate leading to an annular space communicating with the socket cavity through the interstices of a composite thrust bearing disposed externally of said end plate, and on the other hand through a passage leading from the forward end of the socket to a registering aperture near the flanged edge of the end plate. Circulation is induced by an annulus on the rear end of the bearing sleeve and is partly externally of the bearing shell, through said apertures and interstices and back through said passage, and partly forward through said apertures and back through grooving in the bearing itself.

The same considerations apply to the bottom motor end bearing, and both water chambers are preferably provided with a plugged filling aperture.

In a preferred embodiment for this purpose the cooling chamber is at the bottom of the motor housing and the circulation is provided for partly by drilling a hole axially in the motor spindle and a transverse hole communicating with an annular space behind the bearing sleeve from which the circulated liquid passes through holes in the sleeve into the bearing clearance. After traversing the bearing, the liquid is allowed to pass back to the cooling chamber through holes situated near the outside diameter of the bearing carrying plate.

According to a further feature of the invention, the elimination of heat generated in the bottom motor bearing and of the heat losses in the lower end turns of the wet motor windings is assisted and controlled by arranging for the cooling chamber proper to communicate with an additional water-filled cavity the walls of which are in contact with the cold liquid surrounding the pump and so dimensioned as to ensure dissipation to the surrounding liquid of the heat to be eliminated in conditions of normal or maximum load running of the motor. For this purpose we provide the additional cavity in an end member attached to the motor housing and constructed to serve the purpose of the skid-ring normally provided on the lower end of a submersible pump unit as a protection against damage in hauling and hoisting. The dimensions of the additional cavity are calculated, in accordance with known principles, on the basis of the ascertained heat losses in the motor and assumed mean values for the temperature of the liquid inside the cavities and of the liquid surrounding the pump unit. It will be clear that when the additional cavity is provided in a distinct and detachable member, as in the case of the above-mentioned preferred embodiment using a skid-ring for this purpose, a plurality of such members of different capacities may be provided for alternative use according to the nature and mean temperature of the surrounding liquid in which the pump is designed to work.

In order that the invention may be clearly understood and readily carried into practice, reference will now be had to the accompanying drawings, which illustrate the invention, by way of example only. In the drawings:

Figure 1 is a longitudinal section of a portion of a pumping unit, including the lower and upper ends of the pump and motor respectively, connected together by a combined connecting and fluid admission member;

Figure 2 is a longitudinal section of the upper end of the pump;

Figure 3 is a longitudinal section of the lower end of the motor;

Figure 4:
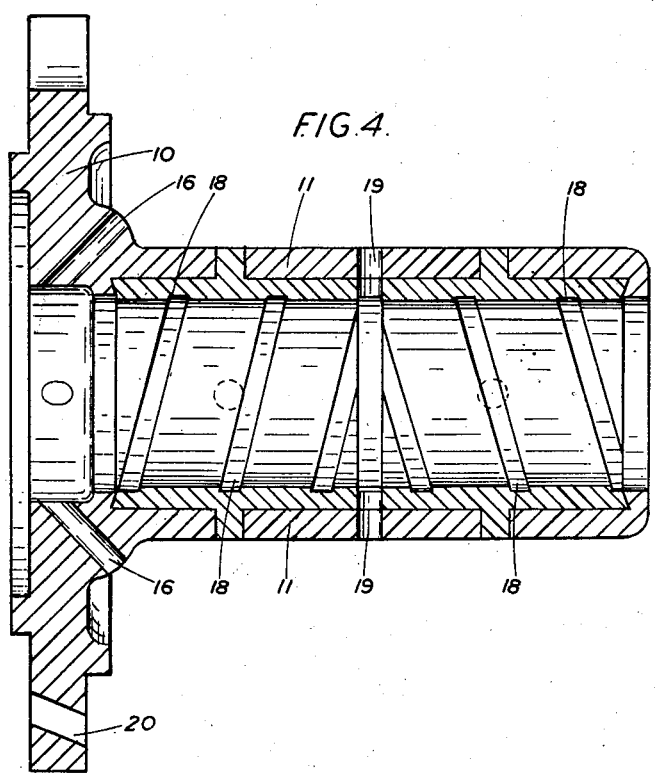
Figure 4 is a longitudinal section of the top motor bearing shell to a larger scale.

Referring to Figure 1 of the drawings, 1 indicates the pump, showing the first stage impeller 2 mounted on shaft 3, driven through coupling 4 by the shaft 5 of motor 6. The casings of the pump 1, and motor 6, are connected together by a combined fluid admission piece and connecting member 7, in accordance with British application No. 5828/41, but subject to a modification, forming part of the present invention, which will be hereinafter described.

Within the admission piece 7 is a cavity formed by a conical socket 8, which contains the coupling 4 and the thrust bearing 9 associated with the motor shaft 5, outside the motor end plate 10, with which is combined the bearing shell 11 for the upper motor bearing. From the upper end of the socket 8 extends the bearing shell 12 for the lower pump bearing, and surrounding the end of this bearing shell is the sand bell 13 to prevent the access of solid matter to the bearing.

Within the upper end compartment of the casing of motor 6 and surrounding the bearing shell 11 for the greater part of its length, in spaced relation thereto, is a stationary sheet metal hood or shield 14, which extends from close to motor end plate 10 to the motor armature and serves to protect the motor windings from damage during assembly, and disassembly. Within the hood or shield 14, close to the armature, is mounted on shaft 5 an annular plate or flange 15.

As will be seen from the detail view in Figure 4, the motor end plate 10 has inclined holes 16 formed therethrough at the root of the bearing shell 11, and the bearing lining 17 has right and left-handed spiral grooves 18 which communicate with one or more radial holes 19 through the bearing shell 11. Also towards its periphery the end plate 10 has an opening 20 communicating with the end of a passage 21 formed on the outside of the socket 8 of the admission piece 7. The forward (upper) end of the passage 21 opens into the narrow end of the cavity of socket 8 and is branched to provide a filling opening 22 closed by a suitable screw plug (not shown).

When in use the whole of the cavity in socket 8 and the chamber at the upper end of motor casing 6 are filled with water through the filling opening 22 by the removal of the plug 22'. Also, as pumped liquid passes into the pump through the admission piece 7 it sweeps over the outside of the wall of socket 8. The rotation of the sand bell 13 in the forward cavity of the admission piece 7 creates turbulence of the inflowing pumped liquid, which circulates round the lower pump bearing shell 12, thereby transferring heat developed in the bearing to the outer wall of the admission piece 7. Within the socket 8 a similar action takes place owing to the rotating coupling 4, which maintains the water in a state of turbulence and circulation within the socket 7. By this means cooled water is forced to flow through the passage 21 back through opening 20 into the upper bearing chamber of the motor casing 6.

In the upper bearing cavity of the motor casing 6 the rotating annular plate or flange 15 causes a circulation of water forwardly between hood 14 and bearing shell 11, some of which passes through the holes 19, and thence in both directions along the bearing grooves 18. Some of the water also issues from the mouth of the hood 14 and passes through the holes 16 into an annular space surrounding the shaft 5, within the composite thrust bearing 9. This water percolates through the interstices of the thrust discs 9 into the cavity in socket 8, whence it enters into circulation in the socket 8, from which water can travel back to the end bearing cavity of motor 6 through passage 21 on the wall of socket 8.

Thus a circulation of water is provided through the upper motor bearing, which also passes over the outsides of the respective bearing shells and transfers heat developed in the bearings to the wall of the admission piece 7 which is in turn cooled both internally and externally by the pumped liquid. This cooling of the bearings ensures the efficient film lubrication of the bearing surfaces, using water as the lubricant fluid. In order that the pumped liquid shall have the maximum cooling effect on the admission piece 7 and thus indirectly on the bearings, it includes longitudinal ribs or fins 24, to increase its area of contact with the liquid drawn into the admission piece through the surrounding gauze or perforated screen 25, and at the same time direct its flow in the longitudinal direction of the bearing shell 12 and socket 8.

Figure 2 shows the upper pump bearing, having the bearing shell 26 supported within a hollow cap 27 which is in turn supported by webs 28 from the end plate 29 of the pump, to which the discharge pipe 30 is bolted, so as to leave radial passages for the flow of the pumped liquid from the periphery of the last impeller stage to the central discharge opening registering with pipe 30. Water from the final pump stage passes along the bearing and into the cavity of the cap 27, which forms an eddying space in which the water is maintained in a state of turbulence by the plate or disc 31 on shaft 3, carrying a relieving or balancing wearing ring 32. Holes 33 at the root of the bearing shell 26 provide communication between the main cavity within cap 27 and the cavity containing the end face of the bearing. The heat taken up from the bearing through the shell 26 and transferred to the wall of cap 27 is absorbed by the pumped liquid flowing over the outside of cap 27 to the pump discharge pipe 30.

Figure 5:
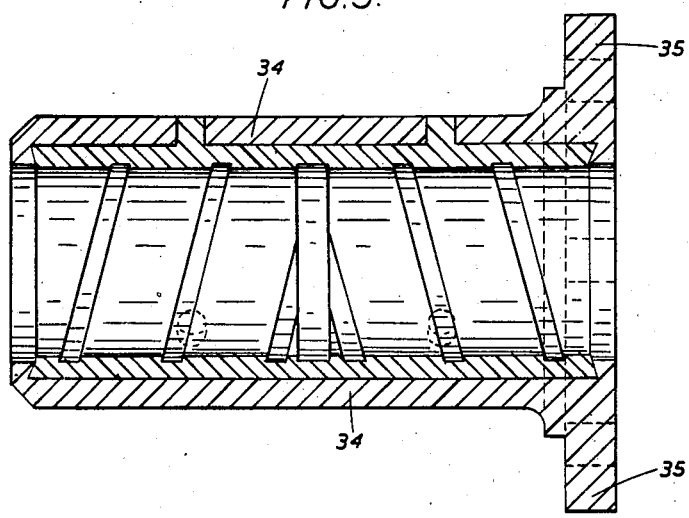
Figure 5 is a similar view of the lower motor bearing shell.

Water lubrication of the lower motor bearing may be provided for as illustrated by Figure 3. At the lower end of the motor is a cavity in which is supported the bearing shell 34 which is carried by a plate 35 attached over an aperture in the hollow end plate 36 of the motor casing. As shown in Figure 5, the bearing lining has right and left handed helical grooves, and the shaft 5 carries a bearing sleeve 37, beneath which the shaft is reduced at 38 to form an annular cavity within the sleeve 37. In the end of the shaft is an axial bore 39 communicating with a transverse bore 40 opening into the said annular cavity in the sleeve 37.

On the shaft 5, facing the end of the bearing shell 34, is an annular plate or flange 41, whilst extending downwardly from the armature of the motor, and surrounding the bearing shell 34 in spaced relation thereto is a sheet metal hood or shield 42 similar to the hood 14 of Figure 1. A circulation of water takes place through bores 39 and 40, into the cavity behind sleeve 37, whence it passes along the grooves of the bearing lining, part returning to the cavity in end plate 36, and part passing forwardly and discharging at the end of the bearing, whence it is circulated back, by the rotating flange 41, through hood 42 along the outside of bearing shell 34, and thence back to hollow end plate 36 through holes 43.

Preferably, in order to provide for a greater volume of circulating liquid, an additional water chamber may be connected with the hollow end plate 36. This may conveniently be provided by employing a hollow skid ring 44 containing a water chamber 45 of suitable volume, having the usual arcuate skid surfaces 46 to facilitate movement of the lower end of the pumping unit along the ground, and a filling plug opening 47. In this case the hollow end plate 36 of the motor, instead of being closed as by a cover plate, is open to provide free communication with the additional water space 45 in the skid ring 44. The volume of the additional water space 45 will be determined in the manner already mentioned, and submersible pumping units may be equipped with a number of different skid rings containing water chambers 45 of varying capacities, for fitting to the motor casing, according to the nature and mean temperature of the liquid in which the pump is to operate.

Figure 6:
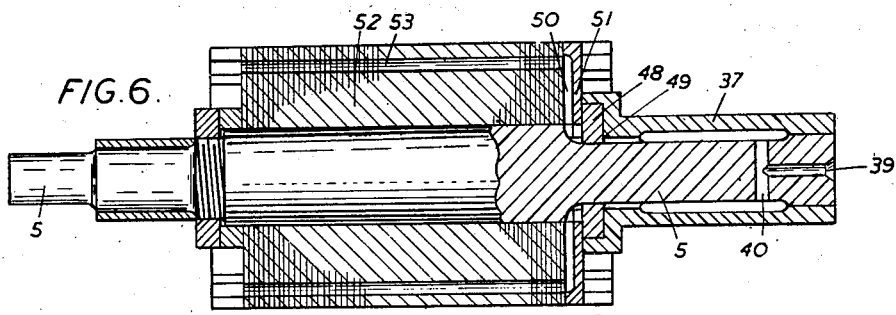
Figure 6 is a longitudinal section, to a reduced scale, of a motor armature providing water circulation through the armature core.
Figure 7:
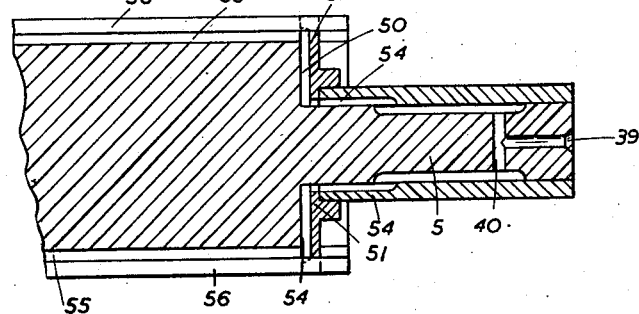
Figure 7 is a similar view illustrating a modification of the construction of Figure 6.

Figures 6 and 7 illustrate means which may be provided for cooling the rotor 52 of the motor itself by water or other fluid circulated from the bottom motor bearing. In the case of Figure 6, which applies to a motor with a laminated rotor, water enters, as in the case of Figure 3, from a cavity at the lower end of the motor casing into a bore 39 in the shaft 5 and thence through a transverse bore 40 into an annular space formed behind the bearing sleeve 37 by reduction of the shaft 5. The bearing sleeve 37 is extended and enlarged at its upper end to accommodate a collar 48, and two grooves 49 are milled along the shaft 5 at diametrically opposite points. These grooves 49 provide communication between the annular space behind bearing sleeve 37, through shaft collar 48, and a pair of radial grooves 50 cut on the inside face of the end clamping plate 51 of the motor rotor 52. The outer ends of these radial grooves communicate with two rotor slots 53 left empty by omitting two bars of the squirrel cage winding. The water cooling the shaft 5 at 39 is thus circulated along these slots 53 and assists in cooling the rotor.

In the modification illustrated by Figure 7, which applies to a motor having a solid rotor, the shaft collar 48 is omitted and instead of milling the two grooves 49 along the shaft 5, grooves 54 are cut along the inner surface of the bearing sleeve 37, whilst the radial grooves 50 in the end plate 51 communicate with spaces 55 left behind two of the squirrel cage bars 56.

The modifications illustrated by Figures 6 and 7 may obviously be applied to the lower motor bearing construction of Figure 3, and it will be readily apparent that a complete submersible pumping unit may comprise a top pump bearing as illustrated by Figure 2, a bottom pump bearing and top motor bearing as illustrated by Figure 1, and a bottom motor bearing as illustrated by Figure 3, with or without either of the modifications illustrated by Figures 6 and 7.

What I claim and desire to secure by Letters Patent is:

1. A pump construction of the class described comprising a casing having a fluid receiving chamber, a bearing in said chamber, an admission piece having heat diffusing walls and connected to said casing adjacent the chamber, said piece having a cavity therein communicating with the said fluid chamber, an operating shaft journaled in the bearing aforesaid and extending into the admission piece cavity, and means on the shaft for inducing fluid in the chamber to flow about the bearing and into the cavity whereby to diffuse the heat taken up from the bearing through the cavity walls.

2. A submersible pump of the class described, comprising a casing, an admission piece connected thereto, having an inlet port and its walls externally cooled by the passage thereover of the liquid being pumped, said piece having a cavity to receive a cooling liquid, and said casing having a chamber communicating with the cavity into which the cooling liquid flows, means for inducing a circulation of said liquid through the cavity and chamber, and means in the cavity for effecting a turbulence of the liquid and greater effective heat flow through the walls of the admission piece to the liquid in which the pump is submerged.

3. A pump construction of the class described, comprising a casing having a cooling liquid receiving chamber therein, a motor bearing in said chamber, an admission piece arranged in said casing, the walls of which are externally cooled by the passage thereover of the liquid being pumped, said admission piece having a cavity to receive the cooling liquid from the chamber aforesaid, a shaft journaled in said bearing and extending into the cavity, rotatable means on said shaft in the chamber for inducing flow of the cooling liquid about the bearing and into the cavity, and an agitating member on the shaft in the cavity for effecting a turbulence of the cooling liquid in said cavity and into contact with its walls, whereby to produce rapid heat transfer therethrough.

4. A pump construction as set forth in claim 3, combined with a shield surrounding the shaft bearing and rotatable means in spaced relation to said bearing and rotatable means to provide a flow passage for the cooling liquid about the bearing, said rotatable means acting to induce a flow of the cooling liquid from about the bearing into the cavity as aforesaid.

5. A pump construction of the class described, comprising a casing, a motor therein, a cooling chamber spaced from said motor to receive a cooling liquid a motor shaft and bearing in said casing, a shield surrounding the shaft and bearing in spaced relation thereto to provide a confined flow passage around the bearing, and a member rotatable with the shaft for inducing circulation of the cooling liquid through said flow passage and into the cooling chamber, said cooling chamber having an inlet port for admitting the cooling liquid into the chamber and pump casing.

6. A pump as set forth in claim 5, wherein the rotatable flow inducing member is mounted on the shaft within the shield, and the chamber walls constitute a skid ring for the base of the pump casing.

7. A pump unit comprising a casing, a motor therein, a motor shaft and bearing in said casing, said shaft having a bore therethrough, a bearing sleeve, a water chamber, said motor and sleeve also having channels therein communicating with the shaft bore through which bore and channels a cooling liquid is adapted to flow, and a rotatable member on said shaft for inducing flow of said cooling liquid through the shaft bore, bearing sleeve, and motor channels to effect cooling of these parts.

8. A submersible pump comprising a casing, a motor mounted therein, a pump mounted in said casing in spaced relation to the motor, an admission piece between the pump and the motor having a cavity in one end thereof and a pump bearing in the other end, a chamber in said casing adjacent the motor, a motor shaft extending through said chamber and into the cavity of the admission piece aforesaid, a pump shaft extending into said cavity and a coupling member connecting said shafts together in said cavity, a motor bearing in the chamber aforesaid and a sleeve therefor having means at one end for separating the cavity of the admission piece from the chamber of the casing and having passages therethrough to establish communication between the chamber and cavity, means mounted on the motor shaft in the chamber for inducing flow of a cooling liquid from said chamber to said cavity and return, a thrust bearing for the motor shaft arranged in the cavity and having passages therethrough communicating with the passages aforesaid in the bearing sleeve, and means on said motor shaft arranged in the cavity of the admission piece, said means and coupling for the shafts being operable to effect a turbulence of the cooling liquid to promote transfer of heat from the cooling liquid through the walls of the admission piece, said admission piece having an inlet port for admitting the liquid to be pumped into the admission piece so as to flow around the pump shaft bearing.

9. A submersible pump comprising a casing, a motor mounted therein, a pump mounted in said casing in spaced relation to the motor, an admission piece between the pump and the motor having a cavity in one end thereof and a pump bearing in the other end, a chamber in said casing adjacent the motor, a motor shaft extending through said chamber and into the cavity of the admission piece aforesaid, a pump shaft extending into said cavity and a coupling member connecting said shafts together in said cavity, a motor bearing in the chamber aforesaid and a sleeve therefor having means at one end for separating the cavity of the admission piece from the chamber of the casing and having passages therethrough to establish communication between the chamber and cavity, means mounted on the motor shaft in the chamber for inducing flow of a cooling liquid from said chamber to said cavity and return, a thrust bearing for the motor shaft arranged in the cavity and having passages therethrough communicating with the passages aforesaid in the bearing sleeve, means on said motor shaft arranged in the cavity of the admission piece, said means and coupling for the shafts being operable to effect a turbulence of the cooling liquid to promote transfer of heat from the cooling liquid through the walls of the admission piece, said admission piece having an inlet port for admitting the liquid to be pumped into the admission piece so as to flow around the pump shaft bearing, and a shield surrounding the motor bearing in spaced relation thereto and in the casing chamber aforesaid to provide constricted passages through which the liquid is induced to flow around the motor bearing.

GILES P. E. HOWARD.